Patented June 15, 1943

2,321,942

UNITED STATES PATENT OFFICE 2,321,942

POLYMERIC MATERIAL

Henry S. Rothrock, Wilmington, Del., assignor to E. I. du Pont de Nemours & Company, Wilmington, Del., a corporation of Delaware No Drawing. Application October 14, 1940, Serial No. 361,188

4 Claims. (Cl. 260—78)

This invention relates to new compositions of matter and more particularly to polymeric materials.

Previous attempts to obtain polymeric and resinous materials suitable for coating compositions through the polymerization of esters of unsaturated alcohols with unsaturated polycarboxylic acids has been confined to the polymerization of esters obtained from unsaturated alcohols in which the carbinol group is attached to an unsaturated atom.

This invention has as an object the production of new and useful compositions of matter. A further object is the manufacture of new polymeric and resinous materials. A still further object is the production of new and improved coating compositions. Other objects will appear hereinafter.

These objects are accomplished by forming polymers from esters of polycarboxylic acids and unsaturated alcohols, in which alcohols the carbinol group is attached only to saturated carbon atoms, said polymerization being carried out in the presence of catalysts as hereinafter described, and preferably in thin films in the presence of a metallic drier whereby superior hard, flexible, light-colored films are obtained.

Alcohols useful in making the esters from which the polymers of this invention are obtained include allyl carbinol, China-wood oil alcohol which is prepared by sodium reduction of the methyl esters of China-wood oil acids, and other unsaturated alcohols referred to hereinafter in which the carbinol group is attached only to saturated atoms.

The polymerization of the unsaturated acid esters of the above mentioned unsaturated alcohols can be effected in the presence of a suitable catalyst at room temperatures up to 200° C. or more depending upon the particular ester used. In the preferred practice of this invention the esters are treated with cobalt drier, or other metallic organic compound capable of hardening the films of unsaturated oils, and the ester polymerized directly in the film. Intermediate polymerized esters resembling bodied natural drying oils can be obtained by preliminary heating of the ester.

The invention is further illustrated by the following examples:

Example I

A mixture of 133 g. (0.5 mol) of China-wood oil alcohol, 44.4 g. (0.2 mol) of ethyl maleate, and 200 g. of dry benzene was heated at reflux under an efficient column equipped with a variable take-off. Five grams of sodium was dissolved in 100 cc. of methanol and over a period of two hours 10 cc. of the catalyst solution was added. The rate of addition of the catalyst was adjusted so as to maintain the interchange reaction at a uniform rate. The ethanol liberated by the reaction was removed by distillation and fresh benzene was added to the reaction mixture from time to time to replace that which distilled off. The reaction was complete in about five hours. The product was thoroughly washed with water, the benzene removed by distillation and finally the mixture was distilled under reduced pressure. Some material (28 g.) which boiled at 185–190° C./3 mm. was presumably China-wood oil alcohol. The residue, consisting of China-wood oil alcohol maleate weighed 112 g. After the addition of 0.03% of cobalt as cobalt naphthenate to this ester, a film of the composition air-dried in one hour tack-free, and baked dry in 15 minutes at 100° C.

Example II

Using a procedure similar to Example I, 43 g. (0.5 mol) of methallyl carbinol, 34 g. (0.2 mol) ethyl fumarate, and 300 g. of benzene together with 28 cc. of sodium methylate catalyst solution prepared as in Example I was allowed to react for five and one-half hours and was worked up in a similar fashion yielding 20 g. of methallyl carbinol fumarate boiling at 150–187° C./4 mm. This material set up to a tack-free film in one and one-quarter hours at 100° C. in the presence of 0.03% cobalt in the form of cobalt naphthenate.

Example III

In a manner similar to that of Example I, a mixture of 34.4 g. (0.2 mol) of ethyl fumarate, 107.2 g. (0.4 mol) of oleyl alcohol and 250 cc. of benzene with 30 cc. of sodium methylate catalyst solution prepared as in Example I was allowed to react for five hours. The reaction mixture was then washed with acidified water and the benzene as removed on a water bath under reduced pressure. The residue, chiefly oleyl fumarate, weighed 100 g. This compound when treated with 0.03% cobalt as cobalt naphthenate and baked at 100° C. for 24 hours gave a tack-free film. In 72 hours, it had baked to a very tough, perfectly dry film.

The polymerized esters of the present invention can be obtained from a large variety of unsaturated alcohols in addition to those mentioned in the examples.

Further compounds of this type are citronellol, allyl carbinol; 3-pentynol,

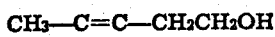

5-methyl-3-hexenol,

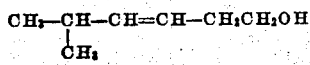

6-phenyl-4-heptenol,

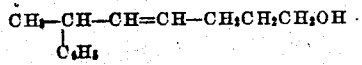

Aliphatic, hydroaromatic, or aromatic polycarboxylic acids can be used in making the polymerized esters of this invention. Suitable acids include maleic acid, fumaric acid, itaconic acid, vinyl malonic acid, citraconic acid, aconitic acid, tetrahydrophthalic acid, 1,2-dihydronaphthalene-3,4-dicarboxylic acid, adipic acid, sebacic acid, phthalic acid, 1,4-dihydronaphthalene-2,3-dicarboxylic acid, tricarballylic acid, and the like.

The metallic drier catalysts of the preferred type are the cobalt, manganese, and lead salts of naphthenic and linoleic acids which are soluble in organic solvents and which are commonly used to catalyze the hardening or "set-up" of natural drying oils. The cobalt salts are usually added in proportions to make about 0.03% cobalt based on the unsaturated ester and from 0.01 to 0.1% may be used. With the lead salts usually sufficient to make about 1.0% of lead based on the unsaturated ester is preferred although from 0.1 to 2.0% may be used. With the manganese salts usually 0.1% of manganese based on the unsaturated ester is preferred and from 0.03 to 0.2% may be used. Other metals, the naphthenic and linoleic acid salts of which are somewhat useful in this capacity are iron, vanadium, copper, and cerium. In some instances the metallic drier catalyst may be replaced by oxygen-yielding catalysts such as benzoyl peroxide, lauroyl peroxide, acetyl peroxide and peracetic acid.

Polymerization of the esters may be carried out alone to produce a varnish or may be admixed with pigments or plasticizers, etc. to produce enamels and other types of coating compositions. Instead of using the pure ester itself, it is sometimes desirable to use mixtures of the present esters or one of these esters and other polymerizable unsaturated compounds to form interpolymers. Thus valuable interpolymers useful in coating and molding are obtained in this manner from other unsaturated compounds such as vinyl esters, acrylic and methacrylic esters, and styrene.

A new class of materials which are useful as vehicles for improved air-drying or baking coating, impregnating, or adhesive compositions and also as molding compositions. For these uses, they can be formulated with pigments, metallic driers, fillers, waxes, inhibitors, plasticizers, and thinners by any of the methods known in the art. Useful coating compositions can also be made from these esters in combination with other film-forming materials such as, for example, drying oils, drying oil varnishes, cellulose acetate, cellulose nitrate, chlorinated rubber and soluble phenol-formaldehyde or urea-formaldehyde resins. When these film-forming materials are used it is sometimes preferable to mix these esters with the other material, subject to a preliminary bodying action and then used as a coating composition. The products of the present invention, with or without the above-noted auxiliary film-forming and other materials, can be used with metals or wood, directly or over suitable base coats, and they can also be used over glass, leather, stone, cloth, paper, rubber, or cellulose, the form of the substrate being immaterial. The products of this invention are useful for molding into any desired form. In addition, they can be prepared in the shape of unsupported films or sheetings. The latter can be employed for a variety of purposes such as for safety glass interlayers, wrapping foils, and the like.

As many apparently widely different embodiments of this invention may be made without departing from the spirit and scope thereof, it is to be understood that I do not limit myself to the specific embodiments thereof except as defined in the appended claims.

I claim:

1. A process for making polymers which comprises heating in the presence of a metallic drier an ester of an unsaturated polycarboxylic acid and an acyclic and completely aliphatic monounsaturated monohydric alcohol in which all the carboxylic groups are esterified by said alcohol, and in which the carbinol group is attached only to a saturated carbon atom.

2. A process for making polymers which comprises heating at about 100° C. in the presence of a metallic drier an ester of an unsaturated polycarboxylic acid and an acyclic and completely aliphatic monounsaturated monohydric alcohol in which all the carboxylic groups are esterified by said alcohol, and in which the carbinol group is attached only to a saturated carbon atom.

3. A process for making polymers which comprises heating at about 100° C. with cobalt drier the completely esterified ester obtained by heating methallyl carbinol and ethyl fumarate in the presence of an alkaline catalyst.

4. A composition of matter comprising the polymerized product obtained by heating in the presence of a metallic drier the completely esterified ester of methallyl carbinol and fumaric acid in which all the carboxylic groups of said acid are esterified by said carbinol.

HENRY S. ROTHROCK.